United States Patent
Kong et al.

(10) Patent No.: US 11,516,824 B2
(45) Date of Patent: Nov. 29, 2022

(54) DYNAMIC UE BEAM SWITCHING FOR MMWAVE MEASUREMENTS IN ASYNCHRONOUS NETWORKS

(71) Applicant: QUALCOMM Incorporated, San Diego, CA (US)

(72) Inventors: Ting Kong, San Diego, CA (US); Chun-Hao Hsu, San Jose, CA (US); Yongle Wu, San Diego, CA (US); Yong Li, San Diego, CA (US); Jun Zhu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 16/289,603

(22) Filed: Feb. 28, 2019

(65) Prior Publication Data
US 2020/0281005 A1 Sep. 3, 2020

(51) Int. Cl.
*H04W 72/12* (2009.01)
*H04B 7/08* (2006.01)
(Continued)

(52) U.S. Cl.
CPC ...... *H04W 72/1231* (2013.01); *H04B 7/0408* (2013.01); *H04B 7/088* (2013.01);
(Continued)

(58) Field of Classification Search
CPC ......... H04W 72/1231; H04W 28/0236; H04W 56/001; H04W 72/042; H04W 72/0446; H04B 7/0408; H04B 7/088
See application file for complete search history.

(56) References Cited

U.S. PATENT DOCUMENTS 10,447,375 B1 * 10/2019 Padhy ................... H04B 7/088
2010/0273499 A1 * 10/2010 van Rensburg ... H04W 72/1231
455/450
(Continued)

FOREIGN PATENT DOCUMENTS

WO    WO-2018175891 A1    9/2018

OTHER PUBLICATIONS

International Search Report and Written Opinion—PCT/US2020/019332—ISA/EPO—dated May 4, 2020 (183996WO).
(Continued)

*Primary Examiner* — Huy D Vu
*Assistant Examiner* — Bailor C Hsu
(74) *Attorney, Agent, or Firm* — Qualcomm Incorporated

(57) ABSTRACT

Dynamic User Equipment (UE) beam switching for millimeter wave (mmWave) measurements in asynchronous networks is discussed in which a UE configured with a plurality of UE beams receives timing information of detected cells in an asynchronous network, and calculates, based on the timing information, a maximum offset for the detected cells indicating a timing difference between a pair of cells of the detected cells that is larger than a timing difference between any other pair of the detected cells. A UE beam switch from a UE beam to another UE beam of the plurality of beams is scheduled based on the maximum offset, which includes using the maximum offset to determine how often the UE beam switch can be performed. Other aspects and features are also claimed and described.

30 Claims, 8 Drawing Sheets

(51) Int. Cl.
*H04W 72/04* (2009.01)
*H04W 56/00* (2009.01)
*H04W 28/02* (2009.01)
*H04B 7/0408* (2017.01)

(52) U.S. Cl.
CPC ..... *H04W 28/0236* (2013.01); *H04W 56/001* (2013.01); *H04W 72/042* (2013.01); *H04W 72/0446* (2013.01)

(56) References Cited

U.S. PATENT DOCUMENTS

| | | | | |
|---|---|---|---|---|
| 2011/0176483 | A1* | 7/2011 | Palanki | H04W 56/0045 370/328 |
| 2013/0279356 | A1* | 10/2013 | Park | H04W 24/02 370/252 |
| 2013/0301619 | A1* | 11/2013 | Singh | H04W 56/0045 370/336 |
| 2014/0314167 | A1* | 10/2014 | Jeong | H04B 7/0626 375/267 |
| 2016/0007261 | A1* | 1/2016 | Oh | H04W 36/0058 455/438 |
| 2016/0099763 | A1* | 4/2016 | Chen | H04W 56/0045 370/329 |
| 2016/0174244 | A1* | 6/2016 | Kim | H04B 7/0404 370/329 |
| 2016/0242159 | A1* | 8/2016 | Ho | H04B 7/0639 |
| 2017/0111886 | A1* | 4/2017 | Kim | H04W 48/14 |
| 2017/0155481 | A1* | 6/2017 | Miao | H04W 76/15 |
| 2017/0181134 | A1* | 6/2017 | Niu | H04B 17/318 |
| 2018/0199328 | A1* | 7/2018 | Sang | H04W 36/06 |
| 2018/0219717 | A1* | 8/2018 | Lee | H04L 27/26 |
| 2018/0227886 | A1* | 8/2018 | Chou | H04B 7/0695 |
| 2018/0287682 | A1* | 10/2018 | Kwak | H04L 5/0057 |
| 2019/0356444 | A1* | 11/2019 | Noh | H04L 5/0023 |

OTHER PUBLICATIONS

LG Electronics: "Discussion on Gap for Intra-frequency Measurement in FR2," 3GPP Draft, 3GPP TSG-RAN WG4 Meeting AH-1801, R4-1800427, 3rd Generation Partnership Project (3GPP), Mobile Competence Centre, 650, Route Des Lucioles, F-06921, Sophia-Antipolis Cedex, France, vol. RAN WG4, No. San Diego. US, Jan. 22, 2018-Jan. 26, 2018, Jan. 15, 2018 (Jan. 15, 2018), XP051388059, 3 pages, Retrieved from the Internet: URL: http://www.3gpp.org/ftp/tsg%5Fran/WG4%5FRadio/TSGR4%5FAHs/TSGR4%5FAH%2D1801/Docs/ [retrieved on Jan. 15, 2018], Section 2, figures 2,3.
Samsung: "Corrections on Measurements for Mobility Management",3GPP Draft, 3GPP TSG RAN WG1 Meeting AH 1801, R1-1800419, AI 7.1.5.1 RRM, 3rd Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 13, 2018 (Jan. 13, 2018), XP051384856, 4 pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] Section 4.

* cited by examiner

DYNAMIC UE BEAM SWITCHING FOR MMWAVE MEASUREMENTS IN ASYNCHRONOUS NETWORKS

TECHNICAL FIELD

Aspects of the present disclosure relate generally to wireless communication systems, and more particularly, to dynamic beam switching for millimeter wave (mmWave) measurements in asynchronous networks.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a UE, timing information of detected cells in an asynchronous network. The UE may be configured with a plurality of UE beams. The method also includes calculating, based on the timing information, a maximum offset for the detected cells, the maximum offset indicating a timing difference between a pair of cells of the detected cells that is larger than a timing difference between any other pair of the detected cells, and scheduling a UE beam switch from a UE beam to another UE beam of the plurality of beams based on the maximum offset. The scheduling may include using the maximum offset to determine how often the UE beam switch can be performed.

In an additional aspect of the disclosure, an apparatus configured for wireless communication includes means for receiving, at a UE, timing information of detected cells in an asynchronous network. The UE may be configured with a plurality of UE beams. The apparatus also includes means for calculating, based on the timing information, a maximum offset for the detected cells, the maximum offset indicating a timing difference between a pair of cells of the detected cells that is larger than a timing difference between any other pair of the detected cells, and means for scheduling a UE beam switch from a UE beam to another UE beam of the plurality of beams based on the maximum offset. The means for scheduling may include means for using the maximum offset to determine how often the UE beam switch can be performed.

In an additional aspect of the disclosure, a non-transitory computer-readable medium having program code recorded thereon is disclosed. The program code includes program code executable by a computer for causing the computer to receive, at a UE, timing information of detected cells in an asynchronous network. The UE may be configured with a plurality of UE beams. The program code further includes program code executable by the computer for causing the computer to calculate, based on the timing information, a maximum offset for the detected cells, the maximum offset indicating a timing difference between a pair of cells of the detected cells that is larger than a timing difference between any other pair of the detected cells, and program code executable by the computer for causing the computer to schedule a UE beam switch from a UE beam to another UE beam of the plurality of beams based on the maximum offset. The program code executable by the computer for causing the computer to schedule may include program code executable by the computer for causing the computer to use the maximum offset to determine how often the UE beam switch can be performed.

In an additional aspect of the disclosure, an apparatus configured for wireless communication is disclosed. The apparatus includes at least one processor, and a memory coupled to the processor. The processor is configured to receive, at a UE, timing information of detected cells in an asynchronous network. The UE may be configured with a plurality of UE beams. The processor is further configured to calculate, based on the timing information, a maximum offset for the detected cells, the maximum offset indicating a timing difference between a pair of cells of the detected cells that is larger than a timing difference between any other pair of the detected cells, and to schedule a UE beam switch from a UE beam to another UE beam of the plurality of beams based on the maximum offset. The configuration of the at least one processor to schedule may include configuration of the at least one processor to use the maximum offset to determine how often the UE beam switch can be performed.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
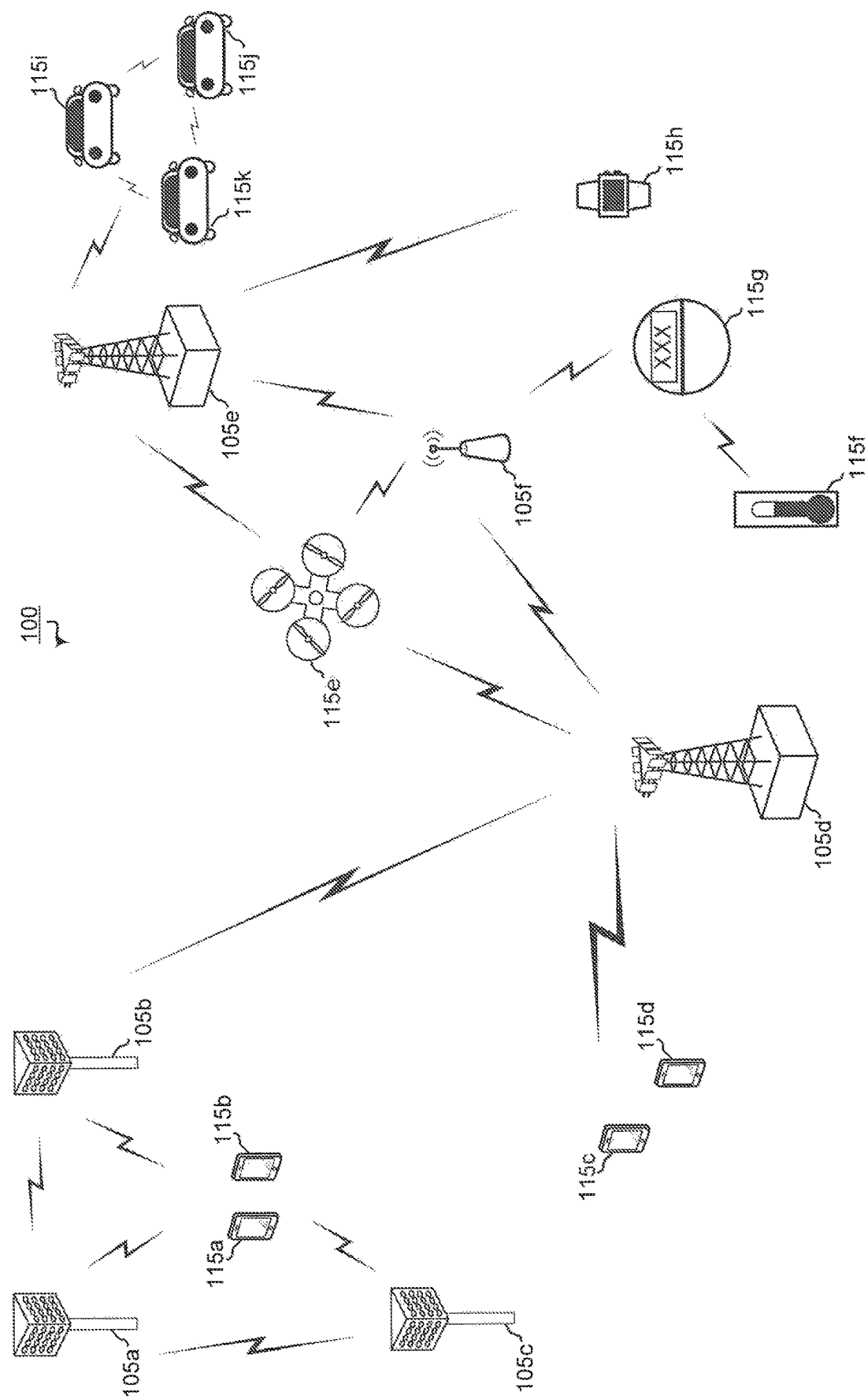
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth, and may occur at 240 kHz.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115$a$-115$d$ of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115$e$-115$k$ illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at 5G network 100, base stations 105$a$-105$c$ serve UEs 115$a$ and 115$b$ using 3D beamforming and coordinated spatial techniques, such as coordinated multipoint (CoMP) or multi-connectivity. Macro base station 105$d$ performs backhaul communications with base stations 105$a$-105$c$, as well as small cell, base station 105$f$. Macro base station 105$d$ also transmits multicast services which are subscribed to and received by UEs 115$c$ and 115$d$. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115$e$, which is a drone. Redundant communication links with UE 115$e$ include from macro base stations 105$d$ and 105$e$, as well as small cell base station 105$f$. Other machine type devices, such as UE 115$f$ (thermometer), UE 115$g$ (smart meter), and UE 115$h$ (wearable device) may communicate through wireless network 100 either directly with base stations, such as small cell base station 105$f$, and macro base station 105$e$, or in multi-hop configurations by communicating with another user device which relays its information to the network, such as UE 115$f$ communicating temperature measurement information to the smart meter, UE 115$g$, which is then reported to the network through small cell base station 105$f$. 5G network 100 may also provide additional network efficiency through dynamic, low-latency TDD/FDD communications, such as in a vehicle-to-vehicle (V2V) mesh network between UEs 115$i$-115$k$ communicating with macro base station 105$e$.

Figure 2:
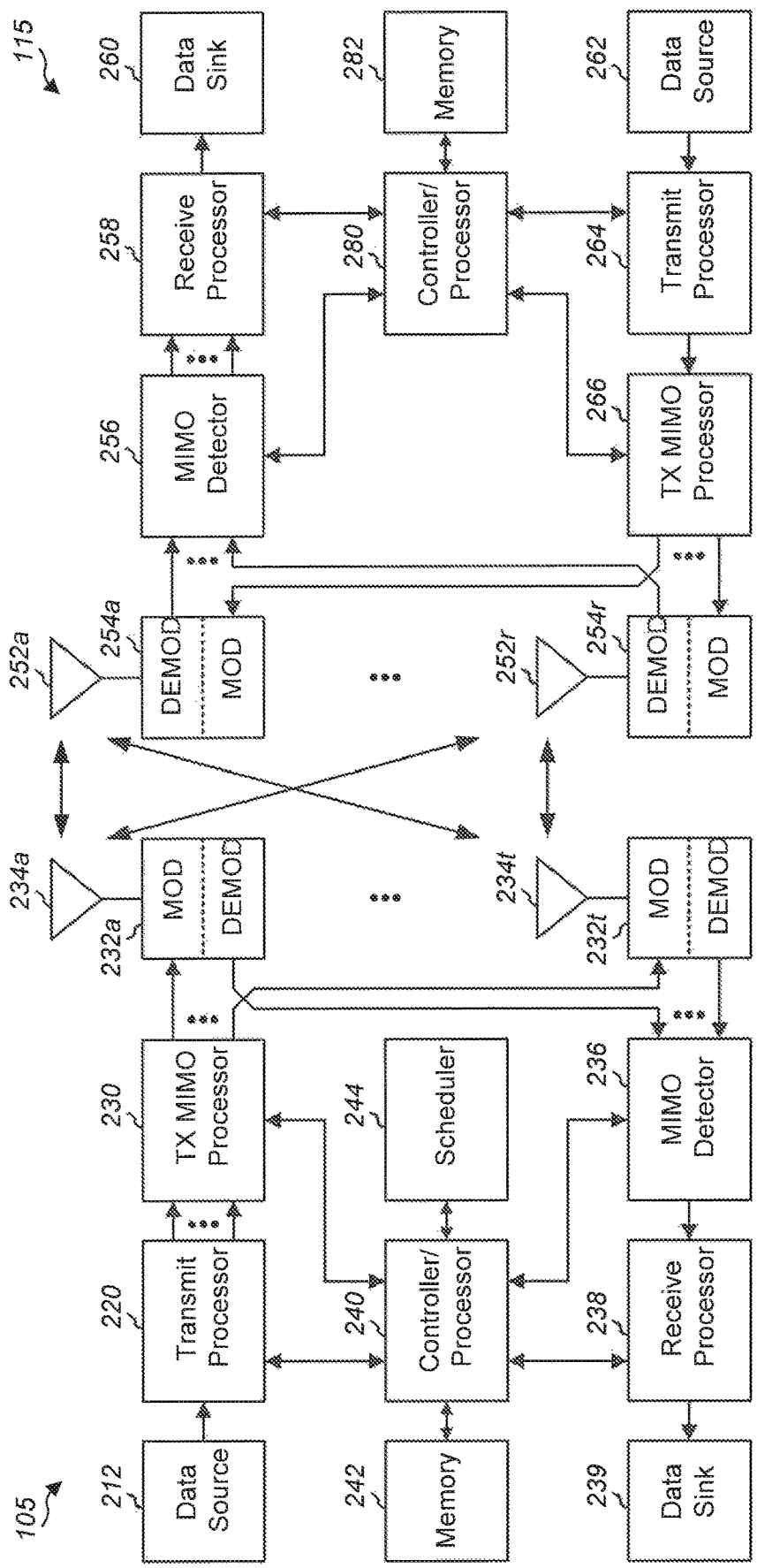
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 4 and 5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In systems implementing 5G NR technologies, e.g., mmWave, beam pair links may be used in order to combat high propagation losses in the high frequency band. In particular, gNB beams and UE beams may be paired together to form beam pair links for carrying control and data channels. For example, as shown in FIG. 1, UE 115a may be configured with a beam in the direction of base station 105a, and base station 105a may be configured with a beam in the direction of UE 115a. UE 115a's beam may be paired together with base station 105a's beam to form a beam pair link. As will be appreciated, using the beam pair link for communications between UE 115a and base station 105a ensures a higher quality of communications. UE 115a may also be configured with a beam in the direction of base station 105b, and a beam in the direction of base station 105c. Base stations 105b and 105c may each be configured with a beam in the direction of UE 115a. Thus, in a similar manner, another beam pair link may be established between UE 115a and base station 105b, and yet another beam pair link may be established between UE 115a and base station 105c. In one particular example, a UE may be configured to use different UE beams to form different beam pair links for a serving cell and different neighboring cells.

In some cases (not illustrated), a UE may be configured with a single beam in the direction of more than one base station. In these cases, a UE beam may be paired with more than one base station beam. As will be further appreciated, a UE may be configured with multiple beams, in different directions. In some implementations, a UE may be configured to support multiple base station (e.g., eNB, gNB, etc.) beams up to 64 beams.

In order to communicate with different cells at an acceptable level of quality, such as for making cell measurements, a UE may switch to the corresponding beam, e.g., a beam in the direction of the cell for which measurements are to be made. For example, UE 115a may be scheduled to make cell measurements for base station 105c, but UE 115a may be presently using the beam in the direction of base station 105a (e.g., using the beam pair link between UE 115a and base station 105a). In order for UE 115a to make cell measurements for base station 105c, UE 115a may perform a beam switch from the beam in the direction of base station 105a to the beam in the direction of 105c. In another sense, UE 115a may switch from the beam pair link with base station 105a to the beam pair link with base station 105c in order to perform cell measurements for base station 105c. As has been noted above, UE 115a switching to the beam pair link with base station 105c may facilitate an acceptable level of quality for the signals used to make the cell measurements for base station 105c. Another beam switch may be made when UE 115a is scheduled to perform cell measurements for another cell. For example, UE 115a may subsequently be scheduled to make cell measurements for base station 105b. In this case, UE 115a may switch from the beam in the direction of base station 105c to the beam in the direction of base station 105b.

Figure 3A:
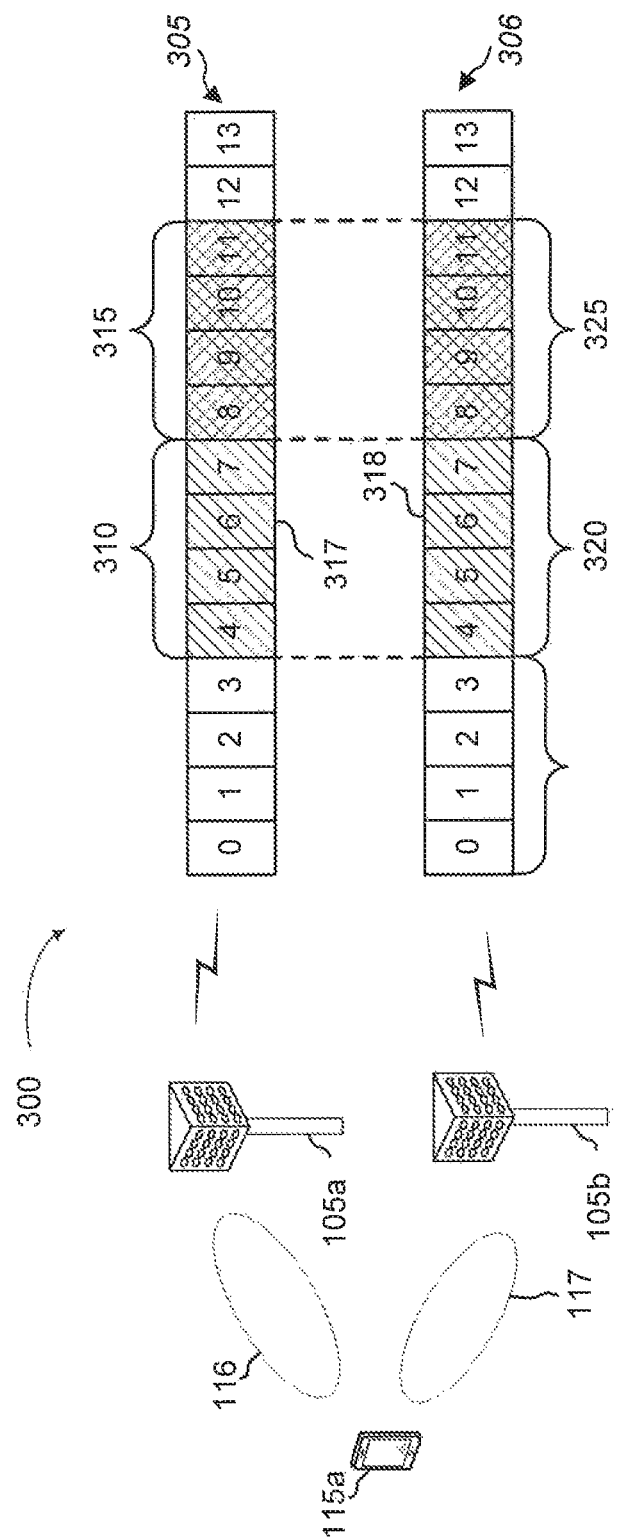
FIG. 3A is a block diagram illustrating a synchronous wireless communication system including UEs and base stations that use directional wireless beams.

In a synchronized network, the timing of the cells within the network, e.g., serving cell and neighboring cells, may be assumed to be aligned. For example, with reference to FIG. 3A, system 300 is shown as a synchronized network. In this implementation, the synchronized network may be configured with timing configuration in which the timing resources of the various network entities may be aligned. For example, synchronized network 300 may include base station 105a and base station 105b. Base station 105a and 105b may be configured with synchronization signal block (SSB) resources (e.g., SSBs 310, 315, 320, and 325, each of which may comprise four symbols) that may be aligned with each other. For example, the symbols of SSBs 310 and 315 of base station 105a may be aligned with the symbols of SSBs 320 and 325 of base station 105b. The SSB may be used for transmissions that include PBCH, PSS, and SSS. In particular, SSS may be included in the third symbol of an SSB. For example, SSB 310 may include SSS in symbol 317, which may be the third symbol of SSB 310, and SSB 320 may include SSS in symbol 318, which may be the third symbol of SSB 320.

SSS symbols may be used for radio frame synchronization. As such, it is important to ensure that, as a UE switches from a beam in the direction of a first base station to a beam in the direction of a second base station, the SSS symbols for the first and second base station are within the same UE beam switch unit in order to maintain synchronization. It will be appreciated that, in synchronized network 300, in which the timing of the cells may be aligned, UE 115a may perform a beam switch once per SSB, while ensuring that the SSS symbols are within the same beam switch unit after the switch.

It will also be appreciated that the description of two base stations in synchronized network 300 is for illustrative purposes and should not be construed as limiting in any way. In some implementations, synchronized network 300 may include more than two base stations, and more than one UE. In these cases, the timing configurations of the various base stations and UEs may be aligned as illustrated and described above.

As used herein, a beam switch unit may refer to a logical aggregation of resources within which a UE may perform a beam switch. For example, UE 115a may perform a beam switch once per SSB, in which case, the beam switch unit may be said to be an SSB. In another case, a UE may perform a beam switch once per slot, in which case, the beam switch unit may be said to be a slot.

Figure 3B:
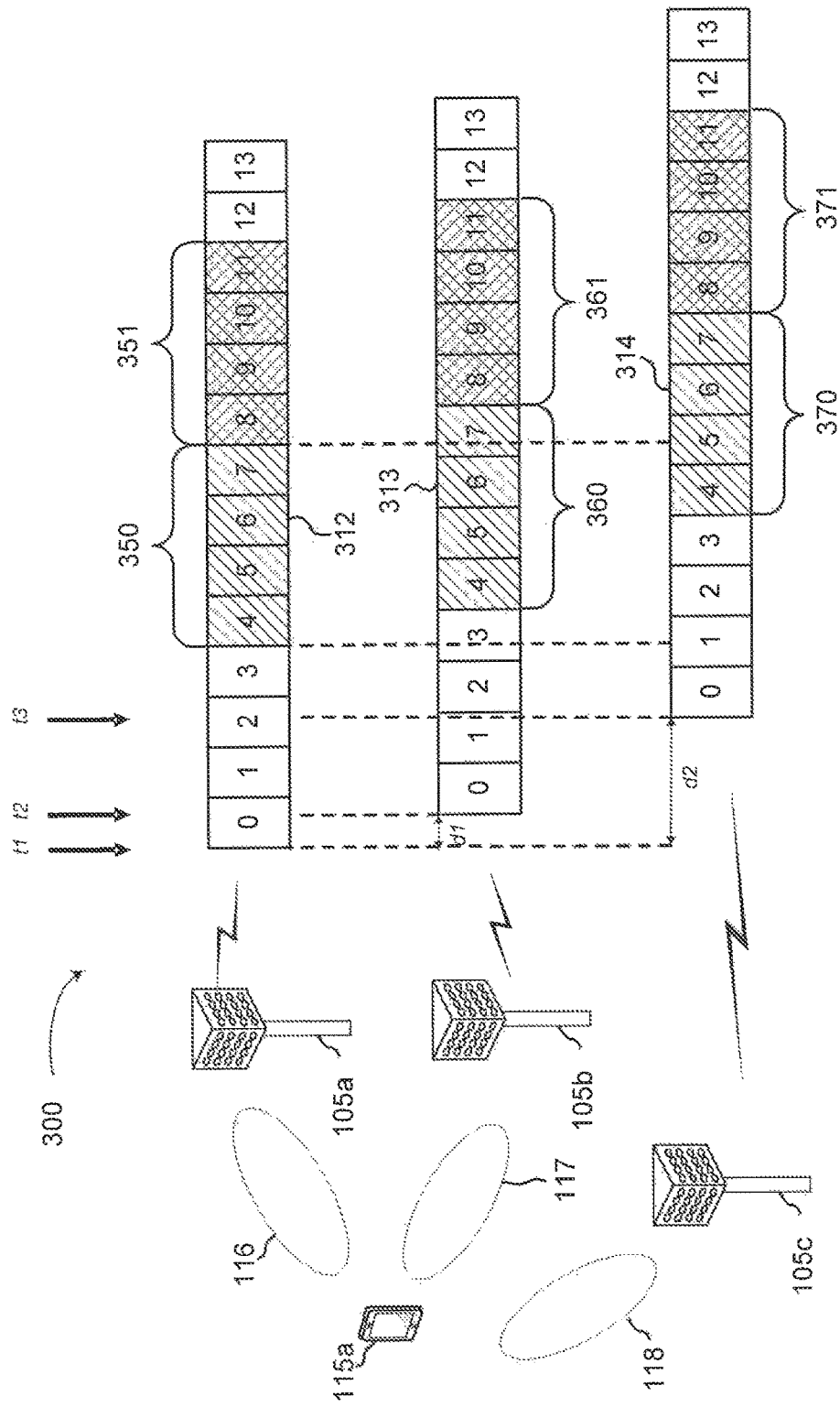
FIG. 3B is a block diagram illustrating an asynchronous wireless communication system including UEs and base stations that use directional wireless beams.

In an asynchronous network, the timing of the cells within the network, e.g., serving cell and neighboring cells, may not be assumed to be aligned. FIG. 3B shows system 300 as an asynchronous network. System 300 may include base stations 105a, 105b, and 105c. In this asynchronous implementation, base stations 105a. 105b, and 105c may have timing configuration in which the timing resources of these base stations may not be aligned. For example, the transmission symbols of base station 105a may not be aligned with the transmission symbols of base stations 105b and 105c, and the transmission symbols of base stations 105b and 105c may similarly not be aligned with each other. In particular, there may be a timing offset d1 between base station 105a's transmissions and base station 105b's transmission, and a timing offset d2 between base station 105a's transmissions and base station 105c's transmission. Consequently, the SSB resources of base stations 105a, 105b, and 105c may not be aligned with each other. In some aspects, the size of the timing offset (e.g., d1 and d2) may be less than a symbol, or may be several symbols long.

In order to ensure synchronization of the SSS symbols as a UE switches from beam to beam, a typical approach in an asynchronous network is to fix the beam switch unit to be an entire search window, which may be dependent on the periodicity of the SSB set (SSBS). In some aspects, the SSBS may define a time period within which the SSBs occur. The periodicity of the SSBS may be related to such time period. For example, for an SSBS with periodicity 20 ms, the SSBS may include the set of SSBs transmitted during a 20 ms window. In aspects, the periodicity of the SSBS may be any one of 5 ms, 10 ms, 20 ms, 40 ms, 80 ms, and 160 ms. In addition, there may be up to 64 SSBs within an SSBS. Thus, in the typical approach, a UE may perform a beam switch once per SSBS.

However, there are several drawbacks associated with the typical approach. Switching a UE beam once per SSBS may waste a large number of measurement opportunities. As noted above, there may be up to 64 SSBs per SSBS. In each SSB, the SSS may be used for cell measurements. Thus, there may be up to 64 measurement opportunities per SSBS. However, as the UE beam switch is fixed per SSBS, a UE is limited, within an SSBS, to only one cell measurement (e.g., the base station with a beam pair link associated with a current UE beam) thereby wasting up to 63 measurement opportunities per SSBS. In addition, many cycles may be needed in order to obtain measurements from all cells (e.g., serving cell and neighboring cells) within a network. For example, in a network in which a UE may be served by one serving cell and may have three neighboring cells, the UE may be configured with a beam for each of the cells. Thus, in order to measure all four cells, the UE may need to switch through all four respective beams. As the UE beam switch is fixed to once per SSBS, and as the SSBS periodicity may be 20 ms, in this case, the UE may need four SSBS periods (or 4*20 ms=80 ms) in order to obtain measurements from each of the four cells. In wireless communications, this delay may be unacceptable, as it may greatly impact UE mobility. For example, UEs obtain cell measurements from the serving cell and neighboring cells (e.g., measurements of RSRP) in order to make cell reselection and handover decisions. Such a large delay may actually lead to radio link failure.

Accordingly, various aspects of the present disclosure are directed to dynamically adjusting a beam switch unit in an asynchronous network for switching a UE beam based on timing offsets among the cells of the asynchronous network. In some aspects, dynamically adjusting a beam switch unit may include using a predefined table to map the timing offsets to target beam switch units. The beam switch units may include any combination of an SSB, a slot, and/or an SSBS. In this sense, the timing offsets may be used to determine how fast beam switches may be performed (e.g., once per SSB, once per slot, once per SSBS, etc.), and may also be used to determine when not to perform a UE beam switch (e.g., a beam switch may be performed no more than once per beam switch unit). As such, it will be appreciated that the various aspects of the present disclosure provide an innovative technique in which more measurement opportunities may be provided and used, which provides better support for mobility and alleviates/obviates the challenges discussed above with respect to typical approaches for beam switching in asynchronous networks.

Figure 4:
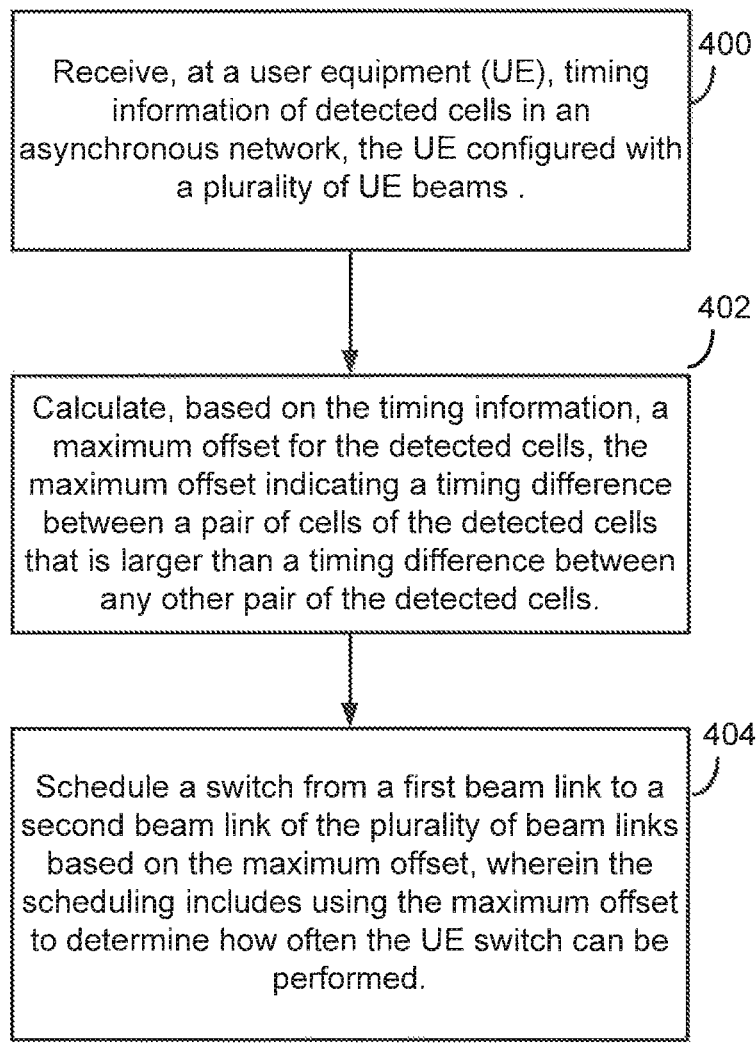
FIG. 4 is a block diagram illustrating example blocks executed to implement one aspect of the present disclosure.
Figure 7:
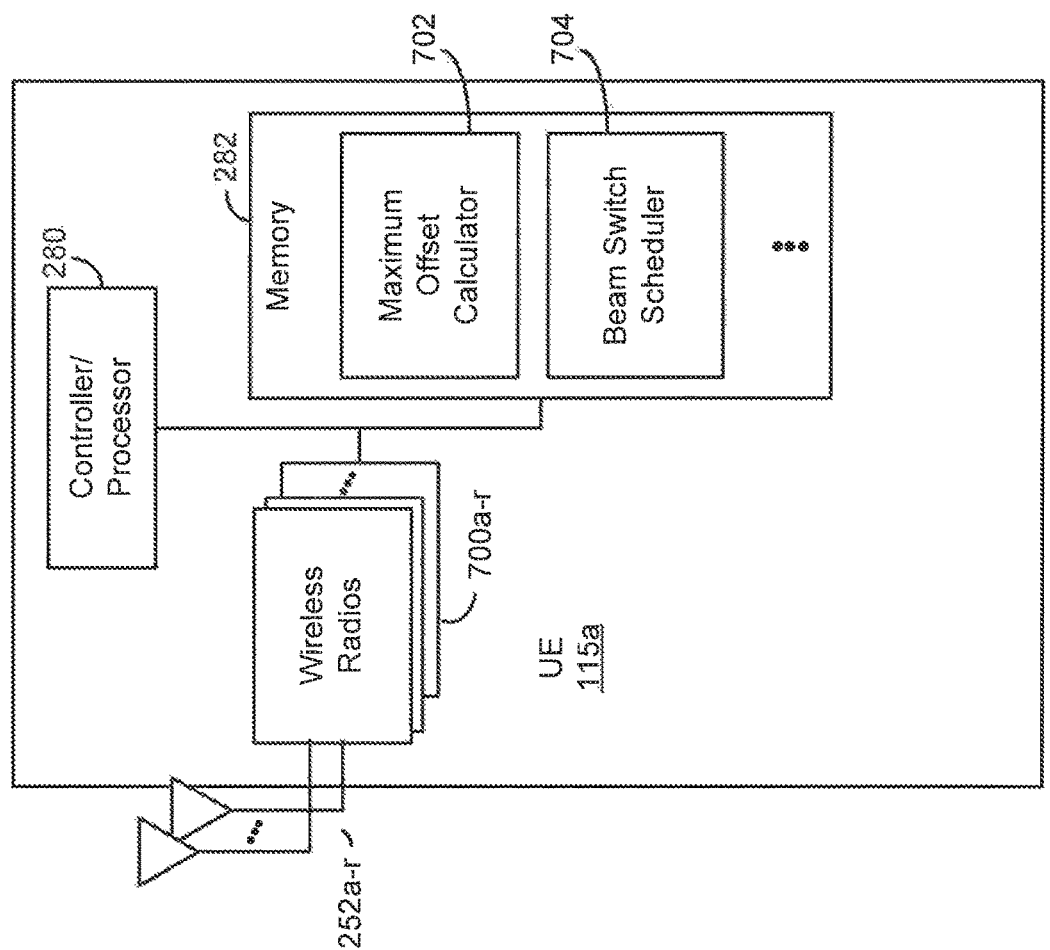
FIG. 7 is a block diagram illustrating detail of an example UE configured according to aspects of the present disclosure.

FIG. 4 is a block diagram illustrating example blocks executed to implement one aspect of the present disclosure. The example blocks will also be described with respect to UE 115 as illustrated in FIG. 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700*a-r* and antennas 252*a-r*. Wireless radios 700*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 400, a UE receives timing information of detected cells in an asynchronous network. For example, a UE, such as UE 115*a* of system 300, receives signals using antennas 252*a-r* and wireless radios 700*a-r*. After decoding the signals, under control of controller/processor 280, UE 115*a* may determine timing information of detected cells. In some aspects, the detected cells may include a serving cell and neighboring cells. The timing information received by the UE may include a timing delay for each of the detected cells. For example, with reference back to FIG. 3B, for base station 105*a*, UE 115*a* may receive cell information that includes a value specifying a delay t1 between UE 115*a* and base station 105*a*. Similarly, UE 115*a* may receive delay information specifying delays t2 and t3 for base stations 105*b* and 105*c*, respectively. In aspects, the delay information may be obtained from results of neighboring cell (Ncell) search operations by the UE to detect the cells. Ncell search may provide the UE with information including the delay information for each of the detected cells. In some cases, the delay for each of the detected cells may be different.

In some aspects, the UE may be configured with a plurality of beams, which may correspond to beam pair links with the detected cells. For example, UE 115*a* may be configured with beam 116 in the direction of base station 105*a*, and may establish a beam pair link with base station 105*a*. Similarly, UE 115*a* may be configured with beams 117 and 118 in the direction of base stations 105*b* and 105*c*, respectively, and may establish a beam pair link with each of base station 105*b* and 105*c* using the respective beam. As will be appreciated, UE 115*a* may similarly establish a beam pair link with other base stations (not shown) of system 300. In some embodiments, UE 115*a* may be configured with up to 64 beams, and may thus be configured to establish up to 64 beam pair links using a respective beam. In this sense, the timing information received by UE 115 may include a delay, relative to UE 115*a*, for each of base stations 105*a*, 105*b*, and 105*c*.

With reference back to FIG. 4, at block 402, a maximum offset for the detected cells is calculated based on the timing information received by the UE. For example, UE 115*a* may execute, under control of controller/processor 280, maximum offset calculator 702, stored in memory 282. The execution environment of maximum offset calculator 702 provides the procedural steps for calculating, based on the timing information received by the UE, a maximum offset for the detected cells. In aspects, the maximum offset for the detected cells may indicate a timing difference between a pair of cells of the detected cells that is larger than the timing difference between any other pair of the detected cells. For example, with reference back to FIG. 3B, delays t1, t2, and t3 have been received by UE 115*a* for base stations 105*a*, 105*b*, and 105*c*, respectively. The base station delays may be used to determine the timing differences between each pair of base stations among base stations 105*a*, 105*b*, and 105*c*.

For example, a timing difference between base station 105*a* and 105*b* may be calculated by subtracting delay t2 of base station 105*b* from delay t1 of base station 105*a*. This operation may yield a timing difference for the cell pair of base stations 105*a* and 105*b*. Similarly, a timing difference between base station 105*a* and 105*c* may be calculated by subtracting delay t3 of base station 105*c* from delay t1 of base station 105*a*, and a timing difference between base station 105*b* and 105*c* may be calculated by subtracting delay t3 of base station 105*c* from delay t2 of base station 105*b*. The largest timing difference from among the calculated timing difference may then be deemed the maximum offset. For example, the timing difference between base stations 105*a* and 105*b*, which is d2, is found to be the largest, and thus, the maximum offset in the example illustrated in FIG. 3B is d2

Alternatively, the maximum offset may be calculated by identifying the smallest delay and the largest delay from the timing information for the detected cells, and then subtracting the smallest delay from the largest delay (e.g., max_async_ncell_time_offset=ncell_largest_delay−ncell_largest_delay). For example, the smallest delay in FIG. 3B may be identified as t1, for base station 105*a*, and the largest delay may be identified as t3, for base station 105*c*. In this case, the maximum offset may be calculated by subtracting t3−t1, which is equal to d2.

As noted above, the UE configured with a plurality of beams may use a first of the plurality of beams to obtain cell measurements from a cell associated with the first beam. In that sense, the UE may currently be using a first beam of the plurality of beams. With additional reference to FIG. 4, at block 404, a switch from a first beam to a second beam of the plurality of beams based on the maximum offset is scheduled. For example, UE 115*a* may execute, under control of controller/processor 280, beam switch scheduler 704, stored in memory 282. The execution environment of beam switch scheduler 704 provides the procedural steps for scheduling a switch from a first beam to a second beam of the plurality of beams based on the maximum offset.

In aspects, scheduling a switch from a first beam to a second beam of the plurality of beams based on the maximum offset may include selecting a beam switch unit, and scheduling the beam switch to be performed within the selected beam switch unit. In aspects, the beam switch unit is selected such that only one beam switch per beam switch unit may be performed. The beam switch unit may be selected based at least in part on the calculated maximum offset and the subcarrier spacing (SCS) used in the particular deployment being used. As noted above, for deployments transmitting using mmWave, SCS may occur with 120 kHz or 240 kHz. In embodiments, the beam switch unit selected for a particular maximum offset may be different depending on the SCS.

In aspects, selecting a beam switch unit may be performed using a predetermined table. The predetermined table may map, for a particular SCS, a maximum offset to a beam switch unit. Table 1 below maps different ranges of maximum offset values to different beam switch units for a deployment using 120 kHz SCS. As can be seen, the beam switch units to which the different maximum offset value ranges may map may be one of an SSB, a single slot, two slots, and an entire SSBS.

TABLE 1

| Beam Switch Unit | Range of maximum offset values |
| --- | --- |
| 1 SSB | 0 < maximum offset value <= 1 symbol (8.9 us) |
| 1 slot | 1 symbol < maximum offset value <= 3 symbols (26.8 us) |
| 2 slots | 3 symbols < maximum offset value <= 5 symbols (44.5 us) |
| 1 SSBS | 5 symbols < maximum offset value |

Table 2 below maps maximum offset values to beam switch units for a deployment using 240 kHz SCS. As can be seen, for 240 kHz SCS, the beam switch units to which the different maximum offset value ranges may map may be one of a single SSB, two slots, four slots, and an entire SSBS.

TABLE 2

| Beam Switch Unit | Range of maximum offset values |
| --- | --- |
| 1 SSB | 0 < maximum offset value <= 1 symbol (4.5 us) |
| 2 slots | 1 symbol < maximum offset value <= 5 symbols (22.5 us) |
| 4 slots | 5 symbols < maximum offset value <= 9 symbols (40.5 us) |
| 1 SSBS | 9 symbols < maximum offset value |

Thus, having calculated a maximum offset at block 402, an appropriate table may be used, based on the SCS, to select a beam switch unit, based on the maximum offset of the detected cells. A beam switch may then be scheduled to be performed within the selected beam switch unit. In aspects, subsequent beam switches may also be performed based on the selected beam switch unit. In that sense, beam switches may be performed once per selected beam switch unit. As will be appreciated, this advantageous approach allows multiple opportunities for cell measurements to be taken. For example, assuming that an SCS of 120 kHz is used in the example illustrated in FIG. 3B, and assuming that the maximum offset is d1<one symbol (ignoring d2), Table 1 may be used to select a beam switch unit of one SSB. Thus, in this case, UE 115*a* may schedule a beam switch once per SSB. As noted above, in some implementations, there may be up to 64 SSBs per SSBS, and thus, up to 64 cell measurements may be performed within an SSBS. This approach offers advantages over the typical approach, as in the typical approach, without the dynamic mechanism disclosed herein, the beam switch is limited to one per SSBS, which wastes up to 63 measurement opportunities per SSBS. Moreover, in the example illustrated in FIG. 31B, UE 115*a* may switch through all three beams 116-118 within 3 SSBs in order to obtain measurements from each of the three base stations 105*a-c*. In the traditional approach, the same operation would take 3 full SSBS.

In some aspects, the beam switch unit may change dynamically. For example, after switching within a selected beam switch unit, UE 115*a* may determine, based on subsequently received timing information from base stations 105*a*, 105*b*, and 105*c*, that the maximum offset of the detected cells has changed. In this case, the appropriate beam switch table may be used to select a new beam switch unit based on the new maximum offset value. After selecting a new beam switch unit, beam switches may be scheduled within the new selected beam switch unit. For example, after selecting a beam switch unit of one SSB, UE 115 may detect that the maximum offset for base stations 105*a*, 105*b*, and 105c has changed (e.g., the maximum offset has increased from less than one symbol to 2.5 symbols). In this case, assuming that an SCS of 120 kHz is used, Table 1 may be used to select a new beam switch unit of 1 slot, as the maximum offset value is greater than one symbol but less than 3 symbols. Subsequent beam switches may then performed once per slot, rather than once per SSB.

It is noted that scheduling the beam switch from a first beam to a second beam based on the maximum offset facilitates ensuring that the SSS symbols of the cell associated with the first beam and the SSS symbol of the cell associated with the second beam are within the same beam switch unit. For example, base stations 105a and 105b have an offset d1 that is less than one symbol. SSS symbol 312 is within SSB 350, which starts at symbol 4, of base station 105a, and SSS symbol 313 is within SSB 360, which starts at symbol 4, of base station 105b. In this case, with a beam switch unit of one SSB, if a beam switch from beam 116 to beam 117 were performed within SSB 350, SSS symbol 313 would still be within the beam switch unit of SSB 350. However, base stations 105a and 105c have an offset d2 that is greater than one symbol. In this case, with a beam switch unit of one SSB, if a switch from beam 116 to beam 118 were performed within SSB 350, SSS symbol 314 within SSB 370, which is the SSB starting at symbol 4, of base station 105c would not be within the beam switch unit of SSB 350. Thus, limiting the selection of a beam switch unit to one SSB only when the maximum offset is less than one symbol in this example ensures that the SSS symbols of the source and target beams remain within the same beam switch unit.

Figure 5:
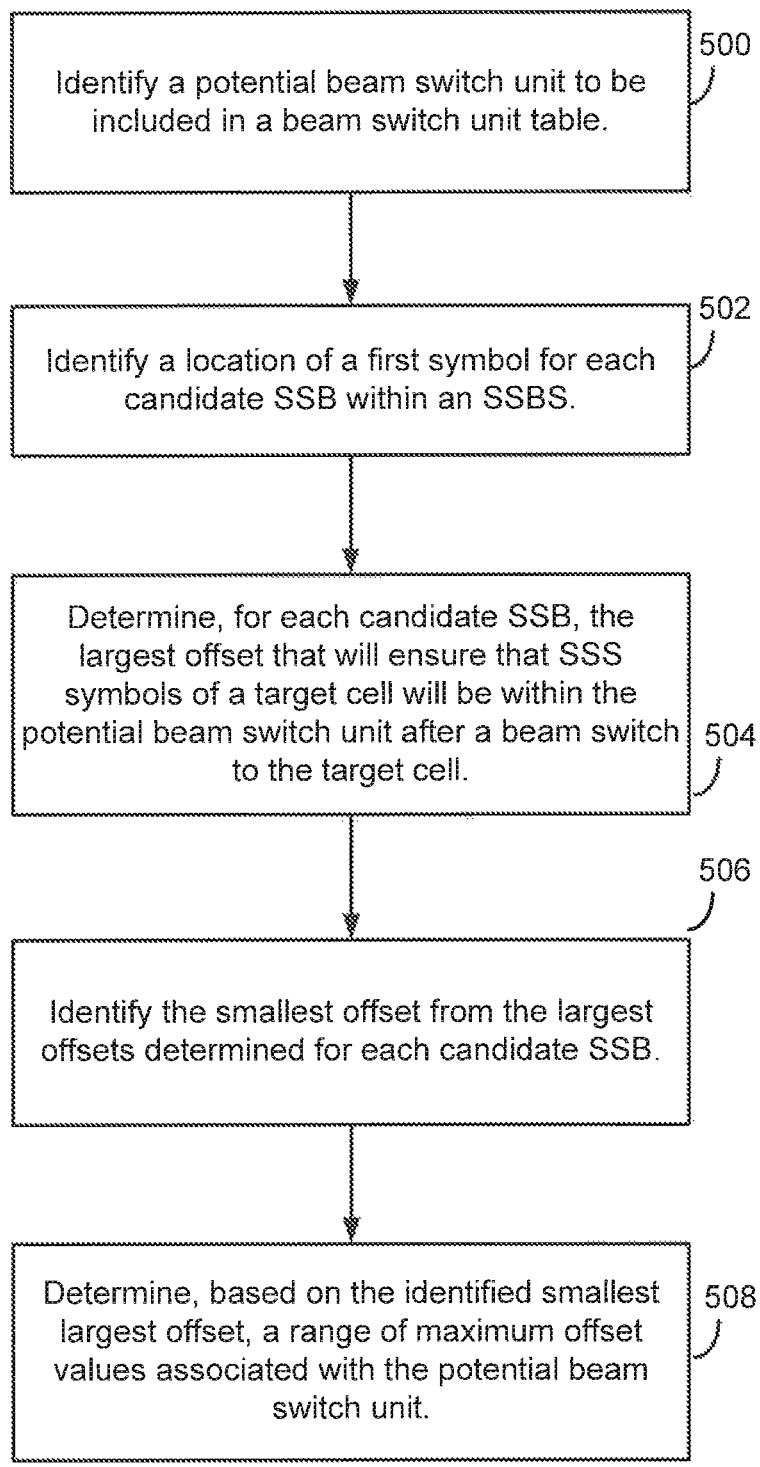
FIG. 5 is a block diagram illustrating example blocks executed to implement one aspect of the present disclosure
Figure 6:
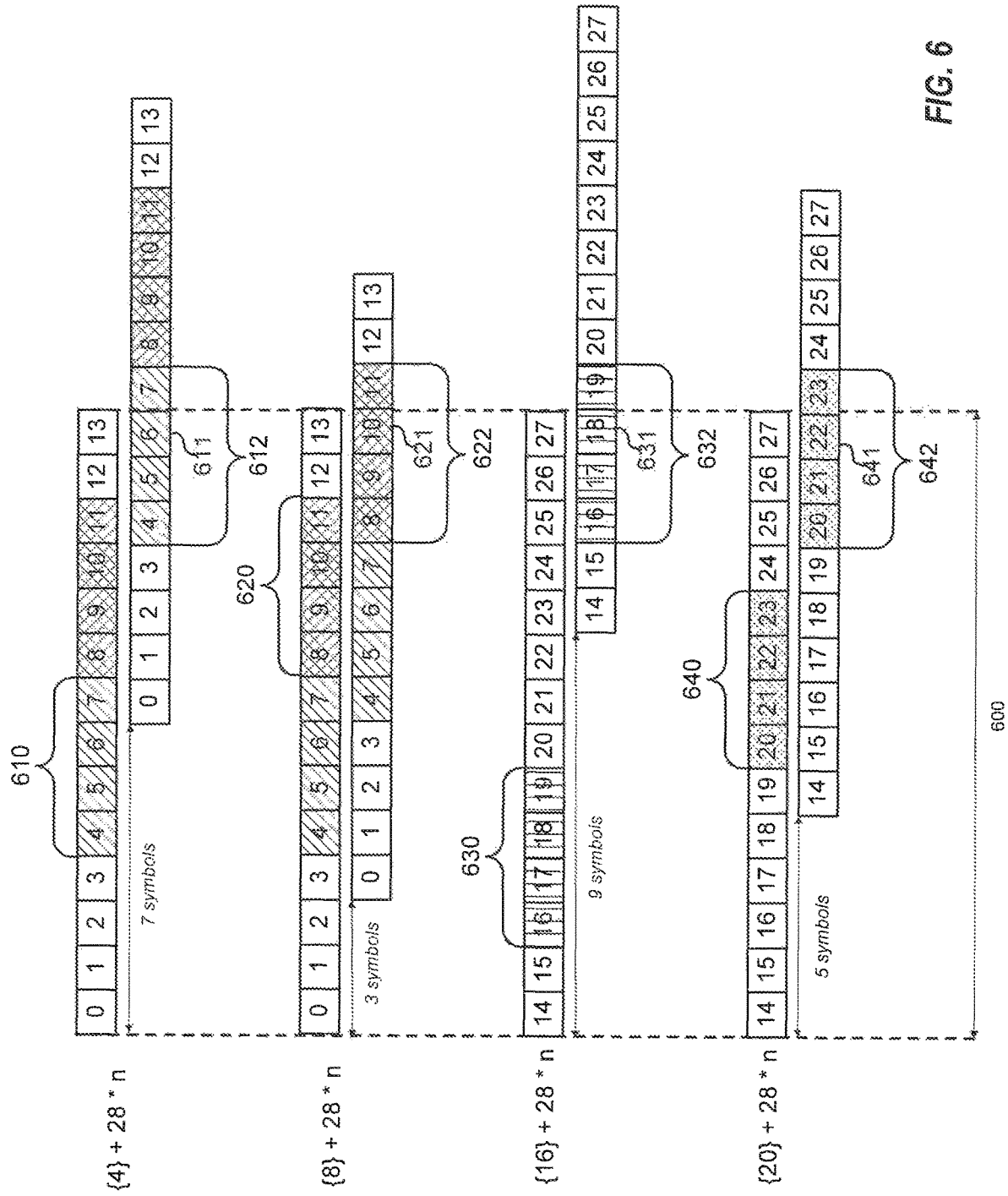
FIG. 6, is a block diagram illustrating an example timing configuration configured according to one aspect of the present disclosure.

FIG. 5 is a block diagram illustrating example blocks executed to implement another aspect of the present disclosure. The example blocks will also be described with respect to the timing diagram shown in FIG. 6. In particular, FIG. 5 is a block diagram illustrating example blocks executed to implement a process for generating beam switch unit tables mapping beam switch units to particular ranges of maximum offset values, such as Tables 1 and 2 described above. As has been noted above, selecting a beam switch unit for scheduling the beam switch from a first beam to a second beam based on the maximum offset facilitates ensuring that the SSS symbols of the cell associated with the first beam and the SSS symbol of the cell associated with the second beam are within the same beam switch unit. It is noted that, although the process disclosed below is described with respect to determining appropriate maximum offset values for a beam switch unit in a system implementing 120 kHz SCS, the process described herein is effective for any numerology, for any beam switch unit, and for any SCS being used.

At block 500 a potential beam switch unit may be identified. In aspects, the potential beam switch unit may be any logical aggregation of time resources. For example, a potential beam switch unit may be any combination, and/or any number of a symbol, an SSB, a slot, or an SSBS. The potential beam switch unit is a beam switch unit that may be included in the desired table, and which may be mapped to a maximum offset range of values. For example, slot 600 may be identified as a potential beam switch unit. It will be appreciated that the potential beam switch unit identified may be dependent on the numerology of the system and or other considerations.

At block 502, a location of a first symbol for each candidate SSB within an SSBS may be identified. For example, in aspects implementing a 120 kHz SCS, there may be four candidate locations for the first symbol of each candidate SSB in an SSBS. The first symbol candidate locations may be given by {4, 8, 16, 20}+28*n, where n may be one of {0, 1, 2, 3, 5, 6, 7, 8, 10, 11, 12, 13, 15, 16, 17, 18}. In aspects implementing a 240 kHz SCS, the first symbol candidate locations may be given by {8, 12, 16, 20, 32, 36, 40, 44}+56*n, where n may be one of {0, 1, 2, 3, 5, 6, 7, 8}. In the example illustrated in FIG. 6, which may be implemented using 120 kHz SCS, the four first symbol candidate locations, for n=1, are identified as symbol 4 of SSB 610, symbol 8 of SSB 620, symbol 16 of SSB 630, and symbol 20 of SSB 640.

At block 504, for each candidate SSB in the SSBS, the largest offset that will ensure the SSS symbols of a target cell will be within the potential beam switch unit after a beam switch to the target cell may be determined. In aspects, determining the largest offset for each candidate SSB may include setting the offset of the target cell such that the SSS symbol is at the edge of the potential beam switch unit. For example, for candidate SSB {4}+28*1, whose first symbol is symbol 4 within slot 600, the target SSB 612 may be positioned such that SSS symbol 611 is at the edge of slot 600. Doing so results in an offset of 7 symbols. This indicates that, for candidate SSBs {4}+28*n, the largest offset that will ensure that the SSS symbols are still within the potential beams switch unit after the beam switch is 7 symbols. A similar process may be performed for candidate SSBs {8}+28*n, which may yield a largest offset of 3 symbols, for candidate SSBs {16}+28*n, which may yield a largest offset of 9 symbols, and for candidate SSBs {20}+28*n, which may yield a largest offset of 5 symbols.

At block 506, the smallest of all the identified largest offsets for all the candidate SSBs may be identified. For example, for candidate SSBs {4, 8, 16, 20}+28*n, the largest offsets, determined at block 504, were determined to be 7, 3, 9, and 5 symbols, respectively. In this case, the smallest of the identified largest offsets is 3 symbols.

At block 508, a range of maximum offset values associated with the potential beam switch unit is determined based on the identified smallest offset. In aspects, the upper end of the range of maximum offset values for the potential beam switch unit may be set as smaller than or equal to the identified smallest offset. As will be appreciated, an upper end value larger than the identified smallest offset may not be effective, as it may not capture the worst case scenario. For example, in the example illustrated in FIG. 6, the worst case scenario may occur for candidate SSBs {4}+28*n, which may have an offset of 3 symbols, smaller than the other candidate SSBs. As such, to ensure that the SSS symbols are within slot 600 after a beam switch, the upper end of the range of maximum offset values may be set to less than or equal to 3 symbols, as anything larger may not be effective for candidate SSBs {4}+28*n. The lower end of the range of maximum offset values may depend on whether a range of maximum offset values has been identified for another beam switch unit, smaller than the potential beam switch unit. If such a range of maximum offset values has been identified for another beam switch unit, the lower end of the range of maximum offsets for the potential beam switch unit may be set equal to the upper end of the other maximum offset values range. For example, if a range of maximum offset values has already been identified for a beam switch unit of one SSB, then the lower end of the maximum offset value range for the potential beam switch unit of one slot may be set as the upper end of the range of maximum offset values for the one SSB. If a range of maximum offset values has not been identified for another beam switch unit, smaller than the potential beam switch unit, then the lower end of the range of maximum offsets for the potential beam switch unit may be set to zero.

The potential beam switch unit and the respective range of maximum offset values may then be entered into the desired beam switch unit table. In aspects, the process above, including steps 500-508 may be repeated for other potential beam switch units to generate a complete beam switch unit table.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2, 4, and 7) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIG. 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CI)), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE) configured with a plurality of UE beams, timing information for each cell of a plurality of detected cells in an asynchronous network, wherein the timing information for each cell of the plurality of detected cells includes information regarding transmission timing for a corresponding cell of the plurality of detected cells asynchronously transmitting with respect to one or more other cell of the plurality of detected cells;

calculating, based on the timing information for pairs of cells of the plurality of detected cells, a maximum offset for the plurality of detected cells, the maximum offset indicating a timing offset between transmissions of a particular pair of cells of the pairs of cells of the plurality of detected cells that is larger than a timing offset between transmissions of any other pair of cells of the pairs of cells of the plurality of detected cells; and scheduling UE beam switching from a UE beam to another UE beam of the plurality of UE beams based on the maximum offset, wherein the scheduling includes using the maximum offset to schedule performing a first UE beam switch from the UE beam to the another UE beam and to establish a schedule by which subsequent switching to the another UE beam can be performed.

2. The method of claim 1, wherein the scheduling the UE beam switch based on the maximum offset includes:
mapping the maximum offset to a UE beam switch unit; and
scheduling the UE beam switch from the UE beam to the another UE beam such that the UE beam switch is performed once within the UE beam switch unit.

3. The method of claim 2, wherein the scheduling the UE beam switch based on the maximum offset facilitates secondary synchronization signals (SSS) symbols from different cells of the plurality of detected cells being within the UE beam switch unit.

4. The method of claim 2, wherein the mapping the maximum offset to the UE beam switch unit is based on a subcarrier spacing.

5. The method of claim 4, wherein the mapping the maximum offset to the UE beam switch unit includes mapping the maximum offset to a particular UE beam switch unit based on the maximum offset falling within a particular range of values.

6. The method of claim 5, wherein mapping the maximum offset to the UE beam switch unit includes mapping:
when the subcarrier spacing is 120 kHz, the maximum offset to:
one synchronization signal block (SSB) when the maximum offset is greater than zero symbols and less than or equal to one symbol;
one slot when the maximum offset is greater than one symbol and less than or equal to 3 symbols;
two slots when the maximum offset is greater than 3 symbols and less than or equal to 5 symbols; and
one SSB set (SSBS) when the maximum offset is greater than 5 symbols; and
when the subcarrier spacing is 240 kHz, the maximum offset to:
one synchronization signal block (SSB) when the maximum offset is greater than zero symbols and less than or equal to one symbol;
two slots when the maximum offset is greater than one symbol and less than or equal to 5 symbols;
four slots when the maximum offset is greater than 5 symbols and less than or equal to 9 symbols; and
one SSBS when the maximum offset is greater than 9 symbols.

7. The method of claim 2, further comprising, subsequent to the scheduling the UE beam switching from the UE beam to the another UE beam:
receiving, at the UE, further timing information with respect to corresponding cells of the plurality of detected cells;
calculating, based on the further timing information, a second maximum offset for the plurality of detected cells; and
scheduling another UE beam switch based on the second maximum offset, wherein the second maximum offset maps to a second UE beam switch unit different than the UE beam switch unit.

8. The method of claim 1, wherein UE beams of the plurality of UE beams correspond to beam links between the UE and each cell of the plurality of detected cells.

9. The method of claim 1, wherein the timing information includes a delay for each cell of the plurality of detected cells relative to the UE, and wherein the maximum offset is calculated by subtracting a smallest delay from a highest delay of the plurality of detected cells.

10. The method of claim 1, wherein the plurality of detected cells include a serving cell and at least one neighboring cell.

11. An apparatus configured for wireless communication, comprising:
means for receiving, at a user equipment (UE), timing information for each cell of a plurality of detected cells in an asynchronous network, the UE configured with a plurality of UE beams, wherein the timing information for each cell of the plurality of detected cells includes information regarding transmission timing for a corresponding cell of the plurality of detected cells asynchronously transmitting with respect to one or more other cell of the plurality of detected cells;
means for calculating, based on the timing information for pairs of cells of the plurality of detected cells, a maximum offset for the plurality of detected cells, the maximum offset indicating a timing offset between transmissions of a particular pair of the pairs of cells of the plurality of detected cells that is larger than a timing offset between transmissions of any other pair of cells of the pairs of cells of the plurality of detected cells; and
means for scheduling UE beam switching from a UE beam to another UE beam of the plurality of UE beams based on the maximum offset, wherein the means for scheduling includes means for using the maximum offset to schedule performing a first UE beam switch from the UE beam to the another UE beam and to establish a schedule by which subsequent switching to the another UE beam can be performed.

12. The apparatus of claim 11, wherein the means for scheduling the UE beam switch based on the maximum offset includes:
means for mapping the maximum offset to a UE beam switch unit; and
means for scheduling the UE beam switch from the UE beam to the another UE beam such that the UE beam switch is performed once within the UE beam switch unit.

13. The apparatus of claim 12, wherein the means for scheduling the UE beam switch based on the maximum offset facilitate secondary synchronization signals (SSS) symbols from different cells of the plurality of detected cells being within the UE beam switch unit.

14. The apparatus of claim 12, wherein mapping the maximum offset to the UE beam switch unit is based on a subcarrier spacing.

15. The apparatus of claim 14, wherein the means for mapping the maximum offset to the UE beam switch unit include means for mapping the maximum offset to a particular UE beam switch unit based on the maximum offset falling within a particular range of values.

16. The apparatus of claim 15, wherein the means for mapping the maximum offset to the UE beam switch unit includes means for mapping:
when the subcarrier spacing is 120 kHz, the maximum offset to:
one synchronization signal block (SSB) when the maximum offset is greater than zero symbols and less than or equal to one symbol;
one slot when the maximum offset is greater than one symbol and less than or equal to 3 symbols;
two slots when the maximum offset is greater than 3 symbols and less than or equal to 5 symbols; and
one SSB set (SSBS) when the maximum offset is greater than 5 symbols; and
when the subcarrier spacing is 240 kHz, the maximum offset to:
one synchronization signal block (SSB) when the maximum offset is greater than zero symbols and less than or equal to one symbol;
two slots when the maximum offset is greater than one symbol and less than or equal to 5 symbols;
four slots when the maximum offset is greater than 5 symbols and less than or equal to 9 symbols; and
one SSBS when the maximum offset is greater than 9 symbols.

17. The apparatus of claim 12, further comprising, subsequent to scheduling the UE beam switching from the UE beam to the another UE beam:
means for receiving, at the UE, further timing information with respect to corresponding cells of the plurality of detected cells;
means for calculating, based on the further timing information, a second maximum offset for the plurality of detected cells; and
means for scheduling another UE beam switch based on the second maximum offset, wherein the second maximum offset maps to a second UE beam switch unit different than the UE beam switch unit.

18. The apparatus of claim 11, wherein UE beams of the plurality of UE beams correspond to beam links between the UE and each cell of the plurality of detected cells.

19. The apparatus of claim 11, wherein the timing information includes a delay for each cell of the plurality of detected cells relative to the UE, and wherein the maximum offset is calculated by subtracting a smallest delay from a highest delay of the plurality of detected cells.

20. A non-transitory computer-readable medium having program code recorded thereon, the program code comprising:
program code executable by a computer for causing the computer to receive, at a user equipment (UE), timing information for each cell of a plurality of detected cells in an asynchronous network, the UE configured with a plurality of UE beams, wherein the timing information for each cell of the plurality of detected cells includes information regarding transmission timing for a corresponding cell of the plurality of detected cells asynchronously transmitting with respect to one or more other cell of the plurality of detected cells;
program code executable by the computer for causing the computer to calculate, based on the timing information for pairs of cells of the plurality of detected calls, a maximum offset for the detected cells, the maximum offset indicating a timing offset between transmission of a particular pair of cells of the pairs of cells of the plurality of detected cells that is larger than a timing offset between transmissions of any other pair of cells of the pairs of cells of the detected cells; and
program code executable by the computer for causing the computer to schedule UE beam switching from a UE beam to another UE beam of the plurality of UE beams based on the maximum offset, wherein the program code executable by the computer for causing the computer to schedule includes program code executable by the computer for causing the computer to use the maximum offset to schedule performing a first UE beam switch from the UE beam to the another UE beam and to establish a schedule by which subsequent switching to the another UE beam can be performed.

21. The non-transitory computer-readable medium of claim 20, wherein the program code executable by the computer for causing the computer to schedule the UE beam switch based on the maximum offset includes:
program code executable by the computer for causing the computer to map the maximum offset to a UE beam switch unit; and
program code executable by the computer for causing the computer to schedule the UE beam switch from the UE beam to the another UE beam such that the UE beam switch is performed once within the UE beam switch unit.

22. The non-transitory computer-readable medium of claim 21, wherein scheduling the UE beam switch based on the maximum offset facilitates secondary synchronization signals (SSS) symbols from different cells of the plurality of detected cells being within the UE beam switch unit.

23. The non-transitory computer-readable medium of claim 21, wherein mapping the maximum offset to the UE beam switch unit is based on a subcarrier spacing.

24. The non-transitory computer-readable medium of claim 23, wherein the program code executable by the computer for causing the computer to map the maximum offset to the UE beam switch unit includes program code executable by the computer for causing the computer to map the maximum offset to a particular UE beam switch unit based on the maximum offset falling within a particular range of values.

25. The non-transitory computer-readable medium of claim 21, further comprising, subsequent to scheduling the UE beam switching from the UE beam to the another UE beam:
program code executable by the computer for causing the computer to receive, at the UE, further timing information with respect to corresponding cells of the plurality of detected cells;
program code executable by the computer for causing the computer to calculate, based on the further timing information, a second maximum offset for the detected cells; and
program code executable by the computer for causing the computer to schedule another UE beam switch based on the second maximum offset, wherein the second maximum offset maps to a second UE beam switch unit different than the UE beam switch unit.

26. The non-transitory computer-readable medium of claim 20, wherein the timing information includes a delay for each cell of the detected cells relative to the UE, and wherein the maximum offset is calculated by subtracting a smallest delay from a highest delay of the detected cells.

27. An apparatus configured for wireless communication, the apparatus comprising:
   at least one processor; and
   a memory coupled to the at least one processor,
   wherein the at least one processor is configured to:
      receive, at a user equipment (UE), timing information for each cell of a plurality of detected cells in an asynchronous network, the UE configured with a plurality of UE beams, wherein the timing information for each cell of the plurality of detected cells includes information regarding transmission timing for a corresponding cell of the plurality of detected cells asynchronously transmitting with respect to one or more other cell of the plurality of detected cells;
      calculate, based on the timing information for pairs of cells of the plurality of detected cells, a maximum offset for the detected cells, the maximum offset indicating a timing offset between transmissions of a particular pair of cells of the pairs of cells of the detected cells that is larger than a timing offset between transmissions of any other pair of cells of the pairs of cells of the detected cells; and
      schedule UE beam switching from a UE beam to another UE beam of the plurality of UE beams based on the maximum offset, wherein configuration of the at least one processor to schedule includes configuration of the at least one processor to use the maximum offset to schedule performing a first UE beam switch from the UE beam to the another UE beam and to establish a schedule by which subsequent switching to the another UE beam can be performed.

28. The apparatus of claim 27, wherein the configuration of the at least one processor to schedule the UE beam switch based on the maximum offset includes configuration of the at least one processor to:
   map the maximum offset to a UE beam switch unit; and
   schedule the UE beam switch from the UE beam to the another UE beam such that the UE beam switch is performed once within the UE beam switch unit.

29. The apparatus of claim 28, wherein scheduling the UE beam switch based on the maximum offset facilitates secondary synchronization signals (SSS) symbols from different cells of the plurality of detected cells being within the UE beam switch unit.

30. The apparatus of claim 28, wherein mapping the maximum offset to the UE beam switch unit is based on a subcarrier spacing, and wherein the configuration of the at least one processor to map the maximum offset to the UE beam switch unit includes configuration of the at least one processor to map the maximum offset to a particular UE beam switch unit based on the maximum offset falling within a particular range of values.

* * * * *